United States Patent [19]
Cullen et al.

[11] Patent Number: 5,207,943
[45] Date of Patent: May 4, 1993

[54] OXYGEN ABSORBER FOR LOW MOISTURE PRODUCTS

[75] Inventors: John S. Cullen, Buffalo; George E. McKedy, Williamsville; Christopher S. Nigon, Orchard Park; Thomas H. Powers, Mayville, all of N.Y.

[73] Assignee: Multiform Desiccants, Inc., Buffalo, N.Y.

[21] Appl. No.: 638,491

[22] Filed: Jan. 7, 1991

[51] Int. Cl.$^5$ .............................................. C09K 15/02
[52] U.S. Cl. ............................. 252/188.28; 502/232; 426/124; 423/338
[58] Field of Search ................... 252/188.28; 502/233

[56] References Cited

U.S. PATENT DOCUMENTS

| | | | |
|---|---|---|---|
| 1,821,388 | 9/1923 | Maude et al. | 252/188.28 |
| 3,990,872 | 11/1976 | Cullen | 55/274 |
| 4,127,503 | 11/1978 | Yoshikawa et al. | 252/429 R |
| 4,166,807 | 9/1979 | Komatsu et al. | 252/439 |
| 4,192,773 | 3/1980 | Yoshikawa et al. | 252/429 R |
| 4,230,595 | 10/1980 | Yamaji et al. | 252/188 |
| 4,317,742 | 3/1982 | Yamaji et al. | 252/188 |
| 4,406,813 | 9/1983 | Fujishima et al. | 252/188.28 |
| 4,524,015 | 6/1985 | Takahashi et al. | 252/188.28 |
| 4,769,175 | 9/1988 | Inoue | 252/188.28 |
| 4,992,410 | 2/1991 | Cullen et al. | 502/407 |
| 5,021,515 | 6/1991 | Cochran et al. | 525/371 |
| 5,049,624 | 9/1991 | Adams et al. | 525/371 |
| 5,085,878 | 2/1992 | Hatakeyama et al. | 426/107 |
| 5,102,673 | 4/1992 | Sugihara et al. | 426/124 |

OTHER PUBLICATIONS

"Silica Structure", MBAA Tech. Quart., vol. 16, No. 2, 1979. (pp. 91-93).
"Customised Silicas—A Science for the Future", by Fernybough and Ryder, MBAA, T. Q No. 3, 1990, p. 95.

Primary Examiner—Richard D. Lovering
Assistant Examiner—Joseph D. Anthony
Attorney, Agent, or Firm—Joseph P. Gastel

[57] ABSTRACT

An oxygen-absorbing composition for absorbing oxygen from an enclosure, such as a package, containing a low-moisture product having an equilibrium relative humidity, or water activity, of between 30% and 90% including in relatively sufficient proportions for absorbing oxygen in the container, particles of iron, particles of a solid electrolyte material, and particles of hydrogel.

19 Claims, 1 Drawing Sheet

OXYGEN ABSORBER FOR LOW MOISTURE PRODUCTS

BACKGROUND OF THE INVENTION

The present invention relates to an oxygen-absorbing composition and to a package containing the composition for placement in an enclosure, such as a container having a low moisture product therein.

By way of background, there are numerous types of low moisture products, such as foods like potato chips, nuts, dried fruits and the like, which are packaged in containers having air therein. It is known that the oxygen which is entrained in these products or which is in the air reacts with these products to cause them to deteriorate to various extents. This deterioration or degradation may be due to the presence of aerobic organisms, biochemical oxidations resulting in deterioration of color or flavor, or chemical deterioration from oxidation of lipids. Also, in certain instances the oxygen-absorbing composition can be used in the packaging of textiles to absorb oxygen and thus deprive larvae and insects of the ability to grow and destroy the textiles. There have been various types of oxygen-absorbing compositions utilized in the past for packaging with foods or other products to absorb the oxygen in order to retard deterioration. However, previous oxygen-absorbing compositions could not efficiently absorb a desired amount of oxygen from a low moisture environment in a relatively short time period, such as between twenty-four and forty-eight hours after packaging, because of the absence of sufficient moisture to produce an oxygen-absorbing action.

SUMMARY OF THE INVENTION

It is accordingly one object of the present invention to provide an improved oxygen-absorbing composition which will absorb oxygen from low-moisture packaged products in a relatively rapid and efficient manner.

Another object of the present invention is to provide an improved oxygen-absorbing composition which can be formulated from existing materials in a simple, efficient and economical manner.

A further object of the present invention is to provide a package containing a composition for absorbing oxygen from a container having a low moisture product therein. Other objects and attendant advantages of the present invention will readily be perceived hereafter.

The present invention relates to an oxygen-absorbing composition for absorbing oxygen from a container having a low moisture product therein comprising in relatively sufficient proportions for absorbing oxygen in said container, particles of iron, particles of a solid electrolyte material, and particles of hydrogel.

The present invention also relates to a package for absorbing oxygen from a container having a low moisture product therein comprising an envelope, and a composition in said envelope comprising in relatively sufficient proportions for absorbing oxygen in said container, particles of iron, particles of a solid electrolyte material, and particles of hydrogel.

The present invention also relates to the combination of a closed container having a low moisture product therein, and a package for absorbing oxygen from said container comprising an envelope, and a composition in said envelope comprising in relatively sufficient proportions for absorbing oxygen in said container, particles of iron, particles of a solid electrolyte material, and particles of hydrogel.

The various aspects of the present invention will be more fully understood when the following portions of the specification are read in conjunction with the accompanying drawings wherein:

DESCRIPTION OF THE PREFERRED EMBODIMENTS

Figure 1:
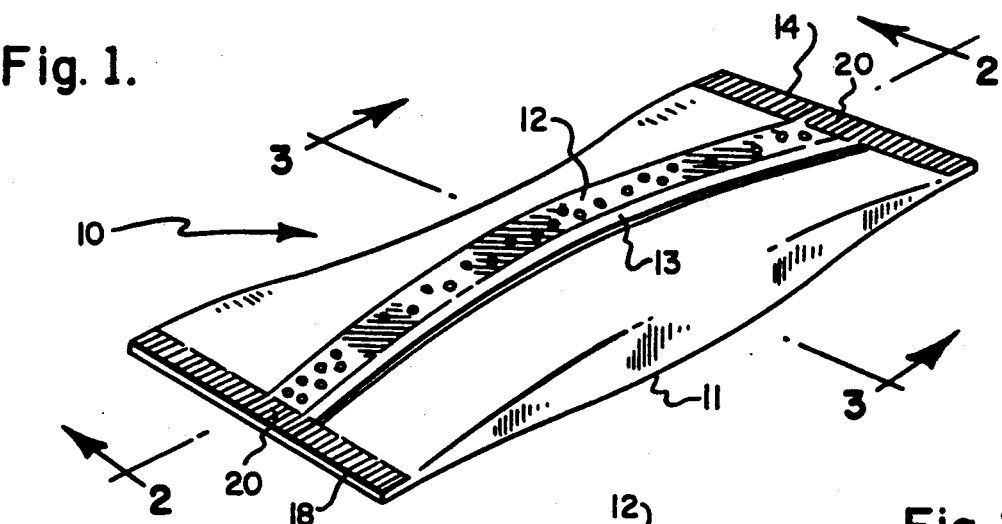
FIG. 1 is a perspective view of the improved oxygen-absorbing package of the present invention.

The improved oxygen-absorbing package 10 of the present invention includes a wall portion 11 fabricated from a flexible planar sheet member which has been folded into tubular form and fused along overlapping edge portions 13 and 15 to provide a seam 12. The fusing is effected by placing the tubular shape over a mandrel and applying sufficient heat and pressure to fuse the area to be sealed. The end portion is then fused at 14 as by heat and pressure, and package 10 is filled with the oxygen-absorbing composition 16 described hereafter. Thereafter, the other end portion is fused at 18 in a crimped pattern, as by heat and pressure, to close the package. The portions 20 at end portions 18 are translucent so that when the packets 10 are formed in a strip, they can be separated by a shear which is activated by a light passing through the translucent portions 20.

The entire package 10 is fabricated from spun-bonded polyolefin, which comprises high density polyethylene fibers which were combined by an integrated spinning and bonding process, and this material provides a number of highly desirable advantages. First of all, this material will transmit water vapor and gases from the environment in which package 10 is placed. However, this material will not pass water in liquid form. Therefore, package 10 will not have its efficacy impaired in the event it is exposed to liquid water nor will it permit liquid water in the oxygen-absorbing composition therein from passing out through the package to the environment in which it is located.

In addition to the foregoing, the virtually opaque spun-bonded polyolefin material 11 becomes transparent in the areas in which it has been fused. Therefore, the seam area 12 comprises a window extending longitudinally of package 10 which permits viewing of the oxygen-absorbing composition within the package. In this respect, as will become apparent hereafter, after the oxygen-absorbing composition within package 10 absorbs oxygen, it will turn a brownish color which can be observed through window 12 to determine whether the oxygen-absorbing composition is still capable of absorbing oxygen or whether it is exhausted.

The material from which package 10 is fabricated is extremely strong, many times stronger than paper. It cannot be torn under normal use conditions and therefore this strength is a feature which is not obtainable with paper wall packages. Therefore, the possibility of spilling the oxygen-absorbing composition 16 from package 10 and permitting this composition to mix with a food product with which it is packaged in another container, is practically impossible. Furthermore, the material of package 11 is noncorrosive in the sense that it is inert when compared to sulfur-bearing paper products and thus this material is manifestly suitable for packaging with food products which are deleteriously affected by exposure to oxygen. A spun-bonded polyolefin which has been found satisfactory can be obtained in various grades under the trademark TYVEK of the Dupont Company.

The package such as described above, except for the specific contents, is disclosed in U.S. Pat.No. 3,990,872, dated Nov. 9, 1976, and this patent is incorporated herein by reference. The reason that the package disclosed in the foregoing patent has been described here is because it has the above-discussed advantages which are extremely relevant to food packaging, and it also permits viewing of the oxygen-absorbing composition through the window 12 for the purpose of determining whether it is still active to absorb oxygen or whether it is exhausted. It will be appreciated, however, that other types of materials may be used for the package which contains the oxygen-absorbing material of the present invention. Also, the package need not be of the disclosed shape, but may be of any suitable shape or construction. In this respect, it may be a coated paper or laminate, or it may be a woven polymer, or a natural fiber material or it may be a microporous material molded into form or extruded or blown into a sheet. The package should have sufficient permeability of air for an efficient reaction, and the Gurley air permeability should be no greater than 11,500 sec/100 cc.

It is known that iron can be used to absorb oxygen from an environment. However, in order for iron to combine with oxygen from the environment and thus remove it therefrom, there must be present an electrolyte material and water. However, with packaged products, such as dry foods like fried snack foods, potato chips, dry ready-to-eat cereals, semi-dry meat products, dehydrated vegetables, nuts, and dried foods, there is insufficient moisture in their packages to combine with an electrolytic material and iron to provide rapid and sufficiently complete oxygen-absorption, to prevent the oxygen from deleteriously affecting the food product. In accordance with the present invention, an oxygen-absorbing composition is provided which comprises a plurality of uniquely integrated components which will provide rapid and effective absorption of oxygen in a container of low moisture product, which can be defined as a product or material which will not contribute enough moisture within its container to permit the deoxygenation reaction to proceed at a required rate.

The oxygen-absorbing composition of the present invention for absorbing oxygen from a container having a low moisture product having a water activity of less than 0.9, such as food, comprises in relatively sufficient proportions for absorbing oxygen in the container, preferably particles of electrolytically reduced iron for providing rapid reactivity with the oxygen, particles of a solid electrolyte material, and particles of hydrogel which provide a source of water in a sufficient amount to dissolve the solid electrolyte material without being excessively bulky so as to inhibit the reactivity of the iron. Thus, high reactivity is achieved because of a unique combination of a highly reactive metal and an extremely efficient carrier of moisture which compensates for the low moisture content of the product which is to be protected from oxidation. The composition is effective to absorb the desired amount of oxygen from a closed container of a low moisture product within twenty-four to forty-eight hours of packaging, thereby greatly reducing the possibility of deterioration of the product by the oxygen. The amount of oxygen which is to be absorbed from a specific container of product will determine the amount of iron which is required, and the rate of absorption will depend on the combination of the highly reactive electrolytic iron and the amount of hydrogel which is used with that of iron, assuming that the proper amount of electrolyte salt is present.

The oxygen-attracting component preferably includes particles of electrolytically-produced iron. It has been found that this type of iron is generally more reactive than the usual hydrogen-reduced iron and thus it will act faster and more completely than the latter. In this respect, within twenty-four to forty-eight hours after it has been exposed to oxygen in the presence of a suitable electrolytic solution, it will react completely to provide ferric oxide ($Fe_2O_3$) whereas during the comparable time frame, hydrogen-reduced iron will generally react more slowly. The reason electrolytically-produced iron is more desirable is because it is more consistent in its rate and extent of reaction than hydrogen-reduced iron to thereby react rapidly and nearly completely. When hydrogen-reduced iron is in its optimum state, it will also react in the same manner as electrolytically produced iron.

It is desirable that there be sufficient iron present in the composition to absorb the desired amount of oxygen from a container of product. Therefore, the ideal amount of iron which should be used is 0.325 grams per 100 cc of oxygen, as this is the stoichiometric amount. If the gas in the container is air, the amount of oxygen is calculated to be approximately twenty percent thereof. However, since the oxygen absorption process is not 100% efficient, the degree of efficiency can be observed and the amount of iron necessary can be adjusted accordingly. For example, if the process in a particular container of a product is determined to be 50% efficient, then twice the 0.325 grams per 100 cc would be used, that is 0.65 grams per 100 cc, and if the process is determined to be 75% efficient, 0.43 grams per 100 cc of oxygen would be required. In any particular situation it may also be desirable to have a factor of safety, and therefore once the average efficiency is calculated, it may be multiplied by a factor of safety, for example 1.25 or 1.5 to actually calculate the amount of iron which is desired. As a general range, the iron should be present in an amount of between about 0.325 and 0.95 grams per 100 cc of calculated oxygen. Because of the efficiency of the system, not more than the 0.95 is generally required. However, if desired, any excess amount may be used for more reserve capacity. The iron may have a particle size of between about 30 mesh and 635 mesh, and more preferably between 100 mesh and 375 mesh, and most preferably between about 200 mesh and 325 mesh.

It will be appreciated that it is preferable to have the amount of iron present with proportionate amounts of the other components so that at least 100% of the total amount of oxygen in a closed container is absorbed within a 24-48 hour period. In other words, while it is preferable that a 100% of the oxygen be absorbed within the foregoing time frame, there are certain conditions and certain foods, such as fish and produce, which do not require complete oxygen-absorption or do not require the absorption to be effected within the 24–48 hour time frame after packaging. Accordingly, the proportions of the components may be adjusted to produce either less than complete absorption, or a slower rate of absorption which occurs within 72–96 hours, or a combination of both. Therefore, the composition can contain a calculated amount of the iron to absorb less than 100% of the oxygen. For example, if it is desired to only absorb 50 cc of the 100 cc present in a container and the process is 100% efficient, only 0.1625 grams of iron would be used, considering that the stoichiometric amount of iron necessary to absorb 100 cc of oxygen is 0.325 grams, with sufficient amounts of the other components to cause this amount of iron to react with the oxygen. In other words, the amount of iron which is used in any particular situation will depend on the desired amount of oxygen to be absorbed. If a slower rate of absorption is desired, a weaker electrolyte may be used, or a lesser or greater amount of the hydrogel, as described hereafter.

The electrolyte which is used can be any common salt which is soluble in water and which will ionize sufficiently in solution when it is present by weight in an amount of between about 1% and 5% of the weight of the iron, depending on the amount necessary to produce satisfactory electrolytic action for oxidizing the iron. An excess of salt is not desired, but in moderate excess amounts it should not be detrimental. Common sodium chloride can be used, or any other suitable food compatible salt can be used including but not limited to sodium sulfate, potassium chloride, ammonium chloride, ammonium sulfate, calcium chloride, sodium phosphate, calcium phosphate and magnesium chloride. For non-food products, other non-food compatible salts can be used.

The hydrogel provides the necessary moisture for combining with the solid electrolyte material, or salt, to produce an electrolyte for effecting the desired reaction between the oxygen and the electrolytically-produced iron particles, and the amount of hydrogel used in combination with the iron determines the speed of the oxygen absorption. The hydrogel is an amorphous silicon dioxide, which is a form of silic acid. It carries up to 70% moisture and yet is still a flowable powder. In contrast, other moisture carriers, such as clay, molecular sieve, silica gel or organic polymers generally carry only 20% to 35% of moisture while still being flowable. However, if an attempt should be made to add more moisture to them, they become a slurry and thus will no longer be a flowable powder which can be efficiently combined with the other components, and further, they will produce an immediate oxygen-absorbing reaction with the iron because of the presence of the liquid water.

The hydrogel provides enough water to produce an electrolytic solution to cause a rapid reaction of the iron with oxygen, without being so bulky, as other moisture carriers are, so that it separates the iron particles from each other to an extent which inhibits electron flow. In this respect, if the hydrogel is present less than a predetermined amount, reactivity of the system will be inhibited due to the lack of water. On the other hand, if too great a percentage of hydrogel is present, there will be sufficient water, but the reactivity of the system will be inhibited because the iron particles are separated too far from each other by the hydrogel. In other words, on the one hand, if there is too little hydrogel, there will be insufficient water, and, on the other hand, if there is too much hydrogel, it acts as an insulator which inhibits oxygen-absorption. Thus, it is the amount of hydrogel which is used with the iron which determines the rate of the oxygen absorption.

Considering that hydrogel contains 50–70% of moisture as compared to 20–35% of moisture of the above-mentioned moisture-carriers, it can be seen that if the other moisture-carriers are used, more than twice the weight of other carriers would be required to get the same amount of water, and therefore such other carriers would be present in an excess amount to produce an undesired insulation effect and thus cause the system to be less reactive so that the oxygen could not be absorbed in as short a time as with the use of hydrogel. Stated another way, the reactivity speed is a function of the mass of the hydrogel and the water, namely, it is inversely proportional to the mass and directly proportional to the amount of water, within certain limits.

The hydrogel may be present by weight in an amount of between about 30% and 300% of the iron, and more preferably between about 50% and 200% of the iron, and most preferably between 100% and 125% of the iron. The hydrogel may have a particle size of between about 48 and 500 mesh, and more preferably between about 100 and 450 mesh, and most preferably between about 150 and 270 mesh. The amount of hydrogel can be further adjusted outside of the above ranges, either by using less or using more, if it is desired to slow down the absorption rate.

The composition of iron, a salt and hydrogel, is formulated merely by combining them in the desired proportions and mixing them to produce a uniform mixture. The mixture is then packaged in the envelopes or packages discussed above relative to FIGS. 1-3.

An optimum composition which has been formulated for completely absorbing 100 cc of oxygen in less than 48 hours under normal atmospheric temperature and pressure comprises by weight about 49.5% of electrolytically-produced iron, about 1.0% of dry sodium chloride, and about 49.5% of hydrogel. The electrolytically-produced iron had a mesh size of 325, the particles of sodium chloride had a mesh size of 325 and the particles of hydrogel had a mesh size of 150.

Figure 2:
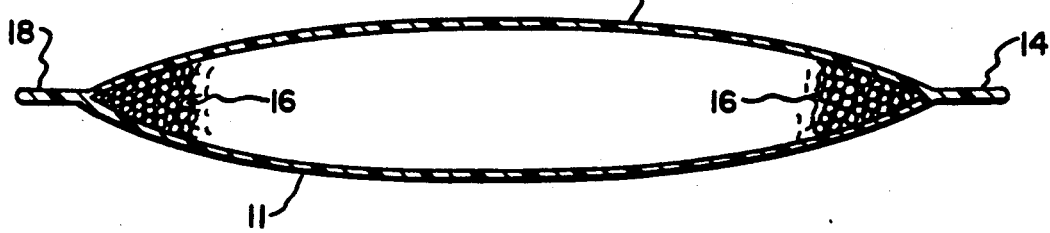
FIG. 2 is a fragmentary cross sectional view taken substantially along line 2—2 of FIG. 1.
Figure 3:
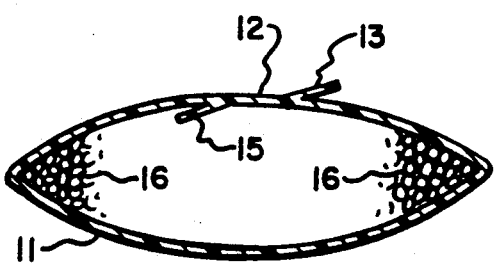
FIG. 3 is a fragmentary cross sectional view taken substantially along line 3—3 of FIG. 1.

The composition of the immediately preceding paragraph when packaged in a package such as shown in FIGS. 1-3 and placed in a sealed container of product, absorbed the listed amounts of oxygen in the listed times.

| EXAMPLES OF OXYGEN ABSORPTION FOR VARIOUS PRODUCTS | | | | | |
|---|---|---|---|---|---|
| (1) | (2) | (3) | (4) | (5) | (6) |
| Pound cake | 50 | 490 | 1.49 | 100 | 36 |
| Freeze dried green beans | 1000 | 6000 | 15.5 | 1200 | 48 |
| Dried milk | 220 | 980 | 3.4 | 200 | 40 |
| Dried milk | 165 | 490 | 1.72 | 100 | 48 |

Where the above columns are:
(1) Product
(2) Weight of product in grams
(3) Volume of container in cubic centimeters
(4) Weight of oxygen-absorbing composition in grams
(5) Amount of oxygen absorbed in cubic centimeters
(6) Time for absorbing oxygen in hours.

While the above discussion has emphasized food products, it will be appreciated that the present composition can be used with any other type of product from which oxygen is to be removed including but not limited to, pharmaceuticals, manufactured products, photographic materials, textiles, tobacco and other oxygen-sensitive chemical, biological and medicinal preparations. In the foregoing respect, certain products are not critically affected by oxygen in a short period of time, and with such products, the absorption rate can be extended by adjusting the ratio of iron and hydrogel outside of the range where complete oxygen absorption is effected within 48 hours, as discussed above.

Figure 4:
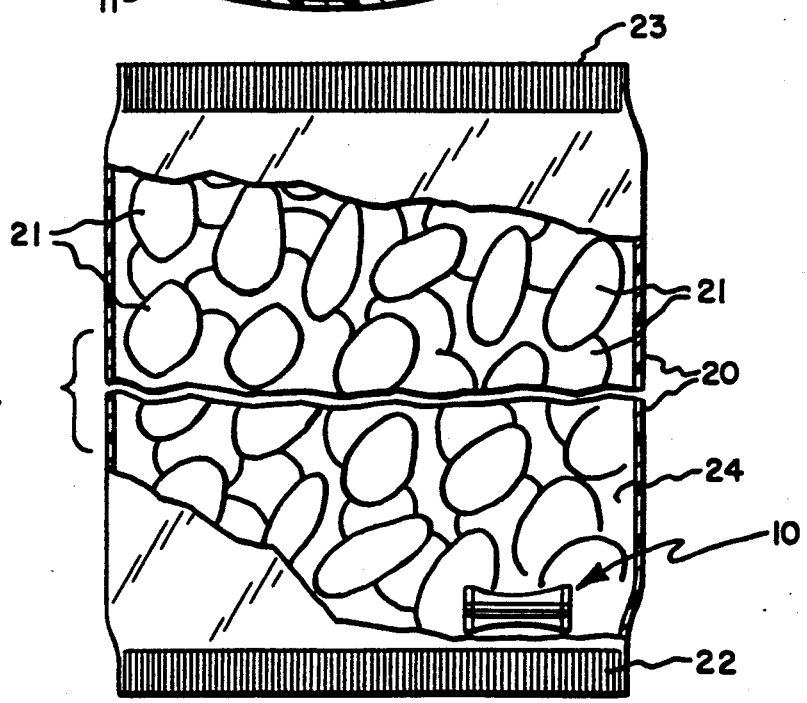
FIG. 4 is a fragmentary side elevational view, partially in cross section, showing a container of low moisture food and the oxygen-absorbing package therein.

In FIG. 4 a pictorial representation of the improved oxygen-absorber 10 is shown in a flexible package 20 of the type containing a dry fried item 21, such as potato chips, the package 20 being sealed at its opposite ends 22 and 23. As can be seen, there is a certain volume of air 24 within the package, and this air obviously contains oxygen. The amount of the oxygen-absorbing composition is calculated to completely absorb the amount of oxygen in the package within 24–48 hours and, in practice, a greater amount of this composition is used to compensate for the fact that the absorption process is less than 100% efficient, thereby preventing the potato chips from become rancid due to their combining with oxygen. While a flexible bag 20 has been shown in FIG. 4, it will be appreciated that the oxygen-absorbing unit 10 may also be used in sealed cans of the type which contain nuts or other food products or dried fruits, or glass packages which may contain vegetables, fruits, preserves, condiments or meats. The oxygen-absorbing unit 10 may also be used in coated board or molded plastic packages.

While preferred embodiments of the present invention have been disclosed, it will be appreciated that it is not limited thereto but may be otherwise embodied within the scope of the following claims.

What is claimed is:

1. An oxygen-absorbing composition for absorbing oxygen from a container having a low moisture product therein comprising in relatively sufficient proportions for absorbing oxygen in said container, particles of iron, particles of a solid electrolyte material, and particles of a hydrogel type of flowable amorphous silicon dioxide containing 50%–70% moisture wherein said hydrogel type of flowable amorphous silicon dioxide in present in an amount by weight of between about 30% and 300% of said iron, and wherein said electrolyte material is present in an amount by weight sufficient to combine with moisture from said hydrogel to provide a sufficiently strong electrolytic solution to effect electrolytic action.

2. An oxygen-absorbing composition as set forth in claim 1 wherein said iron is present in an amount of at least about 0.325 grams per 100 cubic centimeters of oxygen in the container to be absorbed.

3. An oxygen-absorbing composition as set forth in claim 1 wherein said hydrogel type of flowable amorphous silicon dioxide is present in an amount by weight of between about 50% and 200% of said iron, and wherein said electrolyte material is present in an amount by weight sufficient to combine with moisture from said hydrogel to provide a sufficiently strong electrolytic solution to effect electrolytic action.

4. An oxygen-absorbing composition as set forth in claim 1 wherein said hydrogel type of flowable amorphous silicon dioxide in present in an amount by weight of between about 100% and 125% of said iron, and wherein said electrolyte material is present in an amount by weight sufficient to combine with moisture from said hydrogel to provide a sufficiently strong electrolytic solution to effect electrolytic action.

5. An oxygen-absorbing composition as set forth in claim 1 wherein said iron is electrolytically produced iron.

6. An oxygen-absorbing composition as set forth in claim 1 wherein said iron is present by weight in an amount of about 49%, and wherein said electrolyte is present in an amount of about 1%, and wherein said hydrogel is present in an amount of about 49%.

7. An oxygen-absorbing composition as set forth in claim 1 wherein said relatively sufficient proportions are such to absorb at least 50% of the oxygen in said container.

8. An oxygen-absorbing composition as set forth in claim 1 wherein said iron is present in an amount of at least about 0.1625 grams per 100 cubic centimeters of oxygen to be absorbed.

9. A package for absorbing oxygen from a container having a low moisture product therein comprising an envelope, and a composition in said envelope comprising in relatively sufficient proportions for absorbing oxygen in said container, particles of iron, particles of a solid electrolyte material, and particles of a hydrogel type of flowable amorphous silicon dioxide containing 50%–70% moisture wherein said hydrogel type of flowable amorphous silicon dioxide is present in an amount by weight of between about 30% and 300% of said iron, and wherein said electrolyte material is present in an amount by weight sufficient to combine with moisture from said hydrogel to provide a sufficiently strong electrolytic solution to effect electrolytic action.

10. A package as set forth in claim 9 wherein said hydrogel type of flowable amorphous silicon dioxide is present in an amount by weight of between about 50% and 200% of said iron, and wherein said electrolyte material is present in an amount by weight sufficient to combine with moisture from said hydrogel to provide a sufficiently strong electrolytic solution to effect electrolytic action.

11. A package as set forth in claim 9 wherein said hydrogel type of flowable amorphous silicon dioxide is present in an amount by weight of between about 100% and 125% of said iron, and wherein said electrolyte material is present in an amount by weight sufficient to combine with moisture from said hydrogel to provide a sufficiently strong electrolytic solution to effect electrolytic action.

12. A package as set forth in claim 9 wherein said iron is electrolytically produced iron.

13. A package for absorbing oxygen from a container having a low moisture product therein comprising an envelope, and a composition in said envelope comprising in relatively sufficient proportions for absorbing oxygen in said container, particles of iron, particles of a solid electrolyte material, and particles of a hydrogel type of flowable amorphous silicon dioxide containing 50%–70% moisture wherein said hydrogel type of flowable amorphous silicon dioxide is present in an amount of at least 30% by weight of the iron, and wherein said electrolyte material is present in a sufficient amount by weight to combine with moisture from said hydrogel to provide a sufficiently strong electrolytic solution to effect electrolyte action.

14. In combination: a closed container having a low moisture product therein, and a package for absorbing oxygen from said container comprising an envelope, and a composition in said envelope comprising in relatively sufficient proportions for absorbing oxygen in said container, particles of iron, particles of a solid electrolyte material, and particles of a hydrogel type of flowable amorphous silicon dioxide containing 50%–70% moisture wherein said hydrogel type of flowable amorphous silicon dioxide is present in an amount by weight of between about 30% and 300% of said iron, and wherein said electrolyte material is present in an amount by weight sufficient to combine with moisture from said hydrogel to provide a sufficiently strong electrolytic solution to effect electrolytic action.

15. The combination as set forth in claim 14 wherein said hydrogel type of flowable amorphous silicon dioxide is present in an amount by weight of between about 50% and 200% of said iron, and wherein said electrolyte material is present in an amount by weight sufficient to combine with moisture from said hydrogel to provide a sufficiently strong electrolytic solution to effect electrolytic action.

16. The combination as set forth in claim 14 wherein said hydrogen type of flowable amorphous silicon dioxide is present in an amount by weight of between about 100% and 125% of said iron, and wherein said electrolyte material is present in an amount by weight sufficient to combine with moisture from said hydrogel to provide a sufficiently strong electrolytic solution to effect electrolytic action.

17. The combination as set forth in claim 14 wherein said iron is electrolytically produced iron.

18. The combination as set forth in claim 14 wherein said iron is present in an amount of at least 0.16 grams per 100 cc of oxygen in the closed container.

19. The combination as set forth in claim 14 wherein said iron is present in an amount of at least 0.325 grams per 100 cc of oxygen in the closed container.

* * * * *